(12) United States Patent
Schmidhuber et al.

(10) Patent No.: US 8,267,828 B2
(45) Date of Patent: Sep. 18, 2012

(54) ACTUATOR FOR UNITS COMPRISING A PLANETARY GEAR

(75) Inventors: Max Schmidhuber, Freinsheim (DE); Wolfgang Hoedl, Steinbrunn (AT)

(73) Assignee: PS Automation GmbH, Bad Duerkheim (DE)

( * ) Notice: Subject to any disclaimer, the term of this patent is extended or adjusted under 35 U.S.C. 154(b) by 761 days.

(21) Appl. No.: 11/996,344

(22) PCT Filed: Jul. 20, 2006

(86) PCT No.: PCT/EP2006/007134
§ 371 (c)(1),
(2), (4) Date: Jul. 2, 2008

(87) PCT Pub. No.: WO2007/009787
PCT Pub. Date: Jan. 25, 2007

(65) Prior Publication Data
US 2008/0300083 A1    Dec. 4, 2008

(30) Foreign Application Priority Data
Jul. 22, 2005   (DE) .......................... 10 2005 034 340

(51) Int. Cl.
*F16H 23/00* (2006.01)
(52) U.S. Cl. .......................... 475/163; 475/176; 475/177
(58) Field of Classification Search .................. 475/163, 475/176, 177
See application file for complete search history.

(56) References Cited

U.S. PATENT DOCUMENTS

| | | | |
|---|---|---|---|
| 3,169,395 A * | 2/1965 | Enoch et al. ................... | 73/169 |
| 3,391,583 A | 7/1968 | Sheesley | |
| 3,449,982 A | 6/1969 | Hutchinson et al. | |
| 3,788,165 A | 1/1974 | Klotsvog | |
| 5,655,988 A | 8/1997 | Schnell | |
| 6,129,337 A | 10/2000 | Wu | |
| 6,477,918 B2 * | 11/2002 | Sakamoto ....................... | 74/640 |
| 6,607,461 B2 * | 8/2003 | Hagiike ........................ | 475/169 |
| 7,030,526 B2 * | 4/2006 | Tsukamoto et al. ............ | 310/90 |

(Continued)

FOREIGN PATENT DOCUMENTS
DE        511691        1/1930
(Continued)

*Primary Examiner* — Justin Holmes
(74) *Attorney, Agent, or Firm* — Akerman Senterfitt; Peter A. Chiabotti

(57) ABSTRACT

The invention relates to an actuator (10) for units comprising a planetary gear (14), especially a planetary differential gear, whose radially inward region is embodied as a hollow shaft and which is equipped with a drive unit and a driven shaft that cooperates with the unit to be operated. A drive shaft of the planetary gear (14) is connected to the drive unit and can be driven by the same. Said drive shaft is configured as a first hollow shaft (16) while the driven shaft is embodied as a second hollow shaft (40). A planet carrier (28) is provided that is connected to the first hollow shaft (16) or is embodied with the radially inward region thereof as a first hollow shaft (16) in such a way that a rotary movement is also performed by the planet carrier (28) when the first hollow shaft (16) rotates while the drive unit as well as the first (16) and the second hollow shaft (40) encompass a common axis of rotation. Furthermore, at least the smaller of the two internal diameters of the hollow shafts is adapted to the transversal dimensions of a substantially longitudinally extending drive rod of a unit which can be connected to the driven shaft.

18 Claims, 3 Drawing Sheets

U.S. PATENT DOCUMENTS

| | | |
|---|---|---|
| 2005/0098333 A1 * | 5/2005 | Lee ............................... 173/104 |
| 2006/0180780 A1 | 8/2006 | Arai et al. |

FOREIGN PATENT DOCUMENTS

| | | |
|---|---|---|
| DE | 594799 | 9/1934 |
| DE | 2346067 | 3/1975 |
| DE | 4344325 | 6/1995 |
| DE | 19845182 | 4/2000 |
| JP | 2002221259 | 8/2002 |
| WO | WO03052241 | 6/2003 |

* cited by examiner

ACTUATOR FOR UNITS COMPRISING A PLANETARY GEAR

CROSS REFERENCE TO RELATED APPLICATION

This application is a §371 National Phase of PCT/EP2006/007134, filed Jul. 20, 2006 and titled Actuator for Units Comprising a Planetary Gear, the entirety of which is hereby incorporated by reference.

The invention is relative to an actuator for units with a planetary gear.

BACKGROUND

It is generally known that, among other things, planetary gears are used for actuators, so that the speed of a drive is reduced with the aid of this planetary gear to a desired slower speed of an actuator.

In a generally known actuator a motor drives an eccentrically arranged gear via an intermediate gear. A rotatably supported planet wheel is connected to the eccentrically arranged gear and rolls in an internal toothing of a sun gear. Due to the different number of teeth of the two gears a relative speed is created that is transmitted via coupling pins built on the planet wheel onto a driving disk. The driving disk is positively connected by a serration to a shaft. In this manner a relatively compact transmission is produced that, however, requires a relatively large space, viewed radially to the axis of rotation of the planetary gear, on account of the arrangement of the motor and of other components. In addition, the type of connection to the unit to be driven is sharply limited on account of the selected construction of such an actuator.

Furthermore, U.S. Pat. No. 3,391,583 also teaches an actuator with planetary gear for valve control in which a drive is provided that drives a driveshaft of the planetary gear with planet carrier and planet wheels via an appropriate intermediate gear. The driveshaft is almost completely enclosed and encapsulated by a housing element and a formed-on output shaft except for the area of an external toothing that forms a part of the intermediate gear. The rotary motion of the drive is transmitted via the intermediate gear with the appropriate translation onto the driveshaft and the planet wheels that for their part drive the output shaft. Drive, driveshaft and output shaft have no common axis of rotation. The previously cited actuator disadvantageously conditions a spatially extended, areal arrangement of drive and planetary gear. This does not make possible a compact construction of the actuator.

SUMMARY

Starting from this state of the art, the invention has the problem of indicating an actuator with a planetary gear that is constructed as compactly as possible, has a construction that is robust as possible and in addition makes possible the greatest versatility in the arrangement of the individual elements of the actuator.

This problem is solved by the invention with the actuator for units with the features disclosed herein.

The actuator for units in accordance with the invention comprises a planetary gear, in particular a planetary differential transmission, whose radially internal area is designed as a hollow shaft and that comprises an output shaft that cooperates with the unit to be operated. The actuator in accordance with the invention is furthermore provided with a drive. The planetary gear comprises a driveshaft that is connected to the drive and can be driven by it, which driveshaft is designed as a first hollow shaft and the output shaft as a second hollow shaft. The actuator in accordance with the invention is characterized in that a planet carrier is provided that is connected to the first hollow shaft in such a manner that or is designed with its radially internal area as a first hollow shaft in such a manner that upon a rotation of the first hollow shaft the rotary motion is also executed by the planet carrier and, that the drive as well as the first and second hollow shafts are arranged in such a manner that that they have a common axis of rotation and at least the smaller of the two inside diameters of the hollow shafts is adapted to the dimensions in the transverse direction of a drive rod of a unit that can be connected to the output shaft, which drive rod is extended substantially in the longitudinal direction.

In this manner the actuator of the invention avoids that a drive rod, frequently a drive spindle of an actuator, takes up the same spatial area close to the common axis of rotation as the planetary gear itself. In particular, this results in the possibility that the actuator can be arranged totally in the area close to the unit to be driven without the stroke of an adjusting body of the unit and therewith the stroke of the corresponding drive rod being a feature that would hinder the arrangement. In this manner on the one hand the actuator itself becomes more compact and on the other hand the constructive design possibilities for the arrangement of the actuator with a unit are increased.

One advantage of the actuator in accordance with the invention can also be seen in the fact that a penetration of a structural component of the unit through the spatial area of the actuator, namely, through the first and the second hollow shaft, is made possible.

In this manner the axes of rotation of the first and of the second hollow shaft as well as of the drive are combined in a common axis of rotation and the advantage furthermore remains that a drive body for a unit can again be established through the inside area of the hollow shafts. In addition, this makes the construction type of the actuator even more compact. The necessary radial space requirement around the common axis of rotation is correspondingly small.

In addition, it is now possible that the first hollow shaft is directly driven by a drive or, in a constructive variant of the actuator of the invention, forms a part of the drive, in particular the armature of an electromotor or the turbine or the impeller of a hydraulic- or pneumatic drive or -motor, or that the first and the second hollow shafts are designed as a common hollow shaft, and that even the common hollow shaft can be constructed in a constructive modification as part of the drive, in particular as the armature or rotor of an electromotor or as a turbine, rotor or impeller is designed as an armature or rotor of the electromotor or as a turbine, rotor or impeller of a of a hydraulic- or pneumatic drive.

In an alternative embodiment of the actuator of the invention an electromotor, hydraulic- or pneumatic drive is used as drive that comprises another hollow shaft as drive shaft that is connected to the first hollow shaft or is designed as the first hollow shaft and which other hollow shaft is designed as an armature or rotor of the electromotor or as a turbine, rotor or impeller of a hydraulic- or pneumatic drive.

The drive shaft designed as the first hollow shaft and the armature or rotor of the electromotor used as drive or of the hydraulic- or pneumatic drive used as drive are designed in one piece in an advantageous embodiment.

In this arrangement too the axes of rotation of the first hollow shaft, of the second hollow shaft and of the other hollow shaft of the drive are combined in a common axis of rotation and the advantage furthermore continues to remain that a drive body for a unit can again be realized through the inside area of the hollow shafts.

As a result of the above, the number of structural components is further reduced and the actuator rendered more compact.

In an advantageous embodiment the actuator comprises a planetary gear, especially a planetary differential transmission, with a planet carrier that comprises at least one planet wheel, with a drive shaft designed as the first hollow shaft, with an output shaft designed as the second hollow shaft and comprises a first internal toothing that is in engagement with a toothing of the at least one planet wheel, and comprises a support gear comprising a second internal toothing that is also in engagement with the toothing of the at least one planet wheel, and with which support gear the occurring forces or torques can be transferred to a housing with an active connection to the latter and the drive forces can be transferred to the at least one planet wheel or the planet carrier with the first hollow shaft, and an imaginary axis of rotation of the at least one planet wheel is always located outside of the inside diameter of the first hollow shaft.

Since the driveshaft as well as the output shaft are designed as hollow shafts, a free area is produced in the area of the axis of rotation of the hollow shafts which area is formed by the inside diameter of the hollow shafts. This free area can advantageously be utilized for the actuator since driven units usually require a certain adjusting lift as a rule that is usually made available by a spindle with a drive nut driven by the actuator. The adjusting lift can be comparatively large relative to the dimensions of the actuator itself.

A significant advantage of the planetary gear in accordance with the above as well as of the corresponding actuator is that the minimal inside diameter of the first and of the second hollow shaft can be given, namely, in particular for the diameter of a previously described driveshaft of a unit. In this manner such a drive spindle can be readily run through the hollow shaft or the hollow shafts of the planetary gear and/or of the actuator. The construction is correspondingly compact and totally new possibilities result for the arrangement of the planetary gear and/or of the actuator relative to the unit to be driven.

In addition, embodiments of a planetary gear and therewith also of an actuator that are especially favorable for oscillations are possible with planet wheels rotating around the first hollow shaft. The rotating masses are relatively small. An optimum of rotating planet wheels is achieved with three of these gears.

Also, the free end, namely, the end of the first hollow shaft, which end faces away from the second hollow shaft, can be provided in an advantageous further development of the planetary gear of the invention with a connecting element, especially a coupling, for connection to a drive.

An additional advantage results if the inside diameters of the first and of the second hollow shaft and/or of the other hollow shaft of the drive are adapted to each other.

It is achieved in this manner that the inside area of the hollow shaft is substantially without steps or offsets with edges and in this manner possible mechanical hindrances for a drive spindle running through the inside areas are avoided in the construction.

A further advantageous embodiment of the actuator is achieved in that the support gear of the planetary gear comprises an external toothing that is engaged with a toothing with a measuring shaft, that the forces and torques transmitted onto the measuring shaft are received by a spring arrangement connected to the measuring shaft, and that the deflection of the spring arrangement is a measurement for the magnitude of the transmitted force or of the transmitted moment.

In this manner the forces and moments are not simply introduced into the housing and dumped there but rather there is the possibility of directly detecting or indicating the magnitude of the force to be transmitted or of the moment to be transmitted, e.g., via an appropriate display device. Furthermore, this creates an elegant possibility of manually rotating the support gear, e.g., via an appropriate hand wheel. The rotation of the second hollow shaft and takes place directly without the complete reduction of the planetary gear being active.

Further advantageous embodiments of the subject matter of the invention can be gathered from the dependent claims concerning the actuator in accordance with the invention.

The invention, advantageously designed improvements of the invention as well as special advantages of the invention are explained and described in detail using exemplary embodiments represented in the drawings.

DETAILED DESCRIPTION OF THE PREFERRED EMBODIMENTS

Figure 1A:
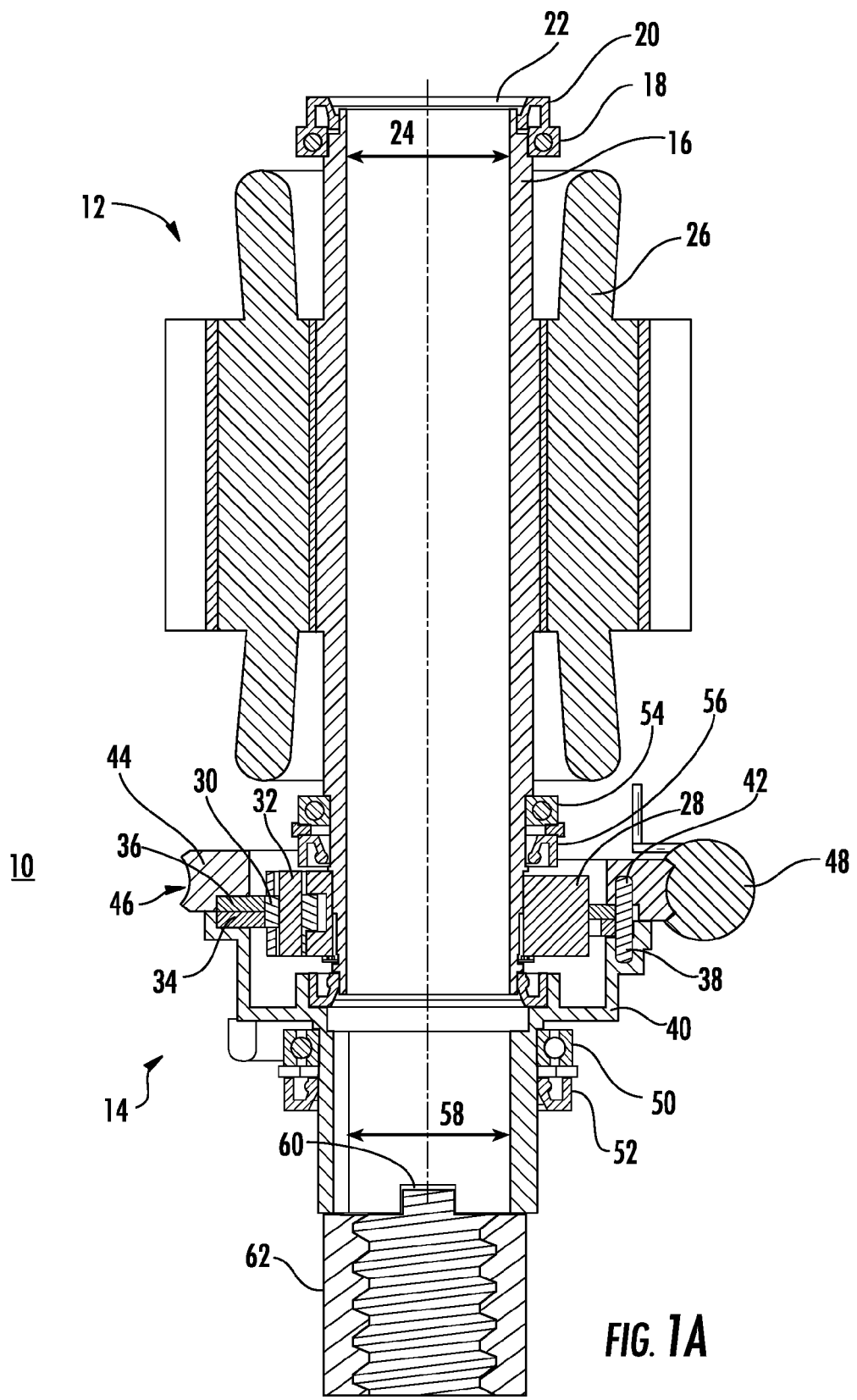
FIG. 1A shows a first actuator
Figure 1B:
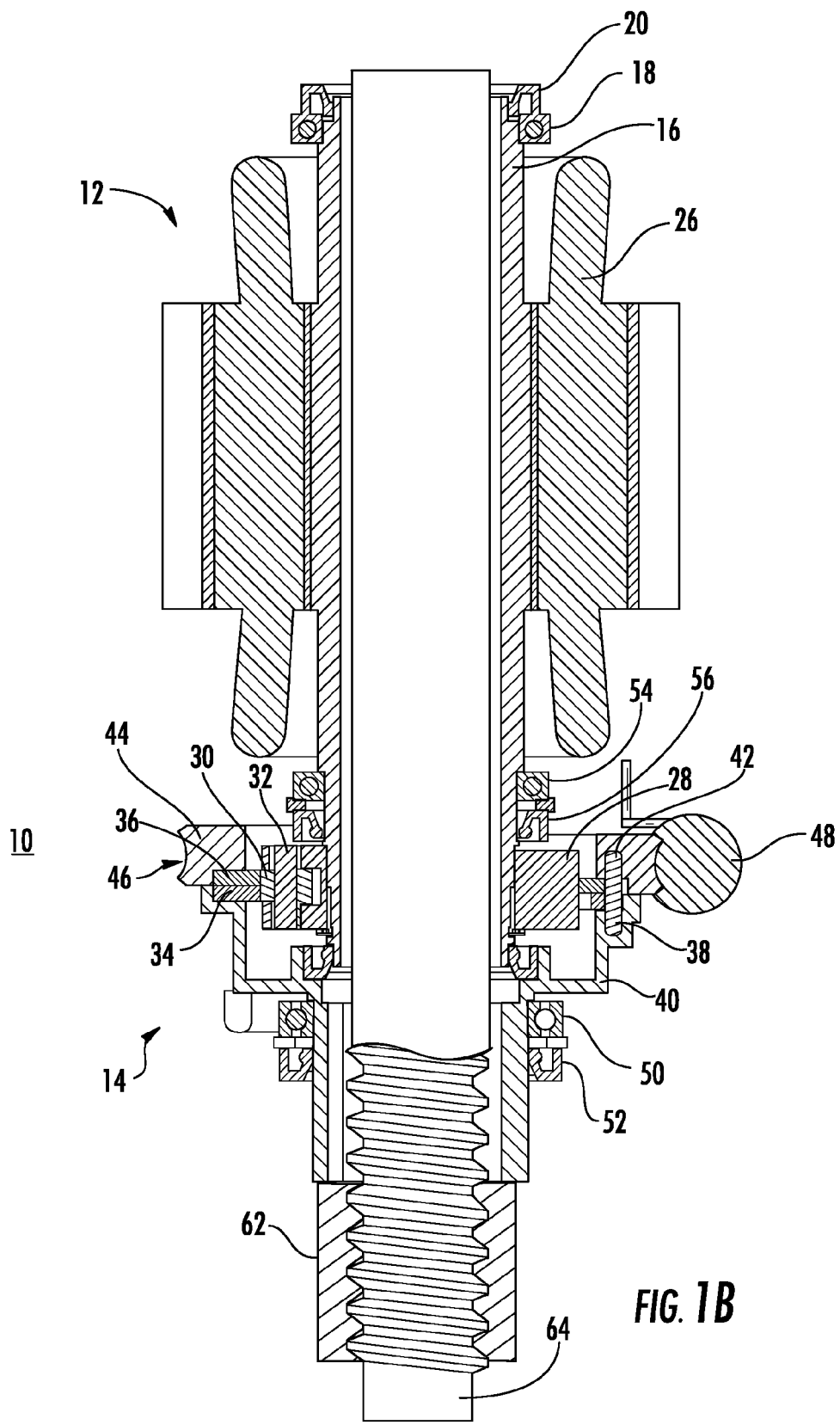
FIG. 1B shows the first actuator including a drive spindle of a unit and
FIG. 2 shows a second actuator for units with a planetary gear.

FIGS. 1A and 1B show a first actuator 10 comprising a first servomotor 12 as well as a first planetary gear 14 designed as a planetary differential transmission. These figures only show the essential mechanical parts necessary for explaining the planet transmission in accordance with the invention and the actuator in accordance with the invention. Thus, e.g., no housing is shown. However, it can be supplemented as needed by the knowledge of an expert in the art so that the customary but not shown structural parts for completing an actuator can be readily completed by an expert in the art.

The first servomotor 12 comprises a first hollow shaft 16 as drive shaft on whose one end a first shaft bearing 18 with a first shaft seal 20 is arranged, which arrangement comprises a recess 22 in the area of the first hollow shaft 16 which recess does not cover the inside area 24 of the first hollow shaft 16 at any position. The inside area 24 has a uniform diameter in its complete longitudinal extension.

The first hollow shaft 16 extends at its other, free end by a certain length over the spatial end of the longitudinal extension of a stator 26 of the first servomotor 12 by a length that ensures that the essential mechanical elements of the first planet transmission 14 can be arranged on this shaft end. Thus, in this arrangement first hollow shaft 16 is designed as the rotor shaft or armature shaft of first servomotor 12 as well as the drive shaft for first planet transmission 14.

The free end of the first hollow shaft comprises the end area of the first hollow shaft facing away from the planet carrier as well as from the second hollow shaft.

A shoulder is formed on the outer jacket surface of the just described other shaft end on which shoulder a planet carrier 28 is arranged. The connection between planet carrier 28 and first hollow shaft 16 can be positively established in an especially simple manner, e.g., by a spring connection or non-positively, e.g., by a shrinking connection or also by other connection techniques familiar to an expert in the art. In addition, it is ensured that the drive forces pass-through first hollow shaft 16 into in a planet carrier 28 so that upon a rotation of first hollow shaft 16 the rotary motion is also executed by planet carrier 28.

In the selected example planet carrier 28 carries three planet wheels and in this sectional view of actuator 10 only a first planet wheel 30 is shown. This planet wheel is supported in such a manner that it can rotate about support bolt 32 held in corresponding recesses of planet carrier 28. According to the invention one planet wheel is sufficient for this. For reasons of oscillation technology a higher number of planet wheels are advantageous. A preferred number is achieved with three planet wheels.

The teeth of an external toothing of the planet wheels, that is, even of first planet wheel 30, engage into the particular internal toothing of a first 34 as well as of a second gear ring 36 and roll over them in accordance with the toothing ratios. The first gear ring 34 is connected by a first connection pin 38 to a second hollow shaft 40 whereas the second gear ring is connected via a second connection pin 42 to a support gear 44. Connection pins 38, 42 establish a secure connection between the particular gear rings 34, 36 and their carriers, that is, second hollow shaft 40 and support gear 44.

In addition, support gear 44 also comprises an external toothing 46 that is engaged with a measuring shaft 48. To this end measuring shaft 48 has a spiral area in its outer jacket surface. Measuring shaft 48 is then supported in a housing that is not shown in this figure so that any occurring forces and moments are reliably conducted away through the measuring shaft into this housing.

Such forces can arise as follows. The first hollow shaft 16 is rotated by first servomotor 12 and thus planet carrier 28 too. In an embodiment of the planetary gear that is favorable from an oscillation technology standpoint three planet wheels are provided, as present here, that are obligatorily moved by the rotation of planet carrier 28. Forces and moments are transferred onto support gear 44 by the rolling of the planet wheels in the internal toothing of second gear ring 36, which support gear finally transmits them into measuring shaft 48. In the view of the measuring shaft as a section through the latter selected in FIG. 1 the just described forces act in its longitudinal direction, so that an appropriate arrangement of springs in its longitudinal direction would be an advantageous possibility for receiving the forces. A possibility is then advantageously achieved for measuring the forces by measuring the deflection of the springs. In addition, the fixing of measuring shaft 48 in the housing brings it about that support gear 44 moves out of its angular position under the influence of the forces and moments only to a minimal extent. The power introduced by the planet wheels into the internal toothing of gear rings 38, 36 will accordingly only put the first gear ring 34 into a rotary movement. This gear ring is namely rotatably supported together with second hollow shaft 40 via a second shaft support 50. In this manner the transmission of forces and moments from the drive shaft, namely, the first hollow shaft 16, onto the output shaft, namely, the second hollow shaft 40, is ensured.

The difference in the number of teeth of the internal toothing between first gear ring 34 and second gear ring 36 must only be an even multiple of the number of planet wheels present for mechanical reasons. In this manner the reduction ratio of the first planetary gear 14 can be especially readily adjusted in the construction via the number of planet wheels and the design of the internal toothings of the rings 34, 36.

Comparable to the situation on first shaft bearing 18, a second shaft seal 52 is also arranged on second shaft bearing 50 which ensures on the one hand that any dirt particles that may be present in the surroundings of first actuator 10 can not pass in the direction of the planetary gear. Even second shaft bearing 50 is supported in the final analysis in its radially external area on a housing of the planetary gear, which is not, however, shown in this figure. A suitable support of the shaft arrangement of first hollow shaft 16 and second hollow shaft 40 is ensured in that a third shaft support 54 with a third shaft seal 56 is arranged at a suitable location between servomotor 12 and first planetary gear 14 on the first hollow shaft 16.

Second hollow shaft 40 has different inside diameters along its longitudinal axis corresponding to its function, of which, however, an extremely small inside diameter 58 corresponds to the diameter of inside area 24. These diameters are adapted to each other. It is ensured in this manner that, e.g. a lift spindle of a unit spindle drive to be driven can be readily run through the two hollow shafts 16, 40 without there being any mechanical trouble spot. The connection of the first actuating transmission to a unit to be driven or to its lift drive or lift linkage is shown only schematically here. In this embodiment a groove 60 is shown on the side of second hollow shaft 40 facing away from the first servomotor 12 which groove constitutes a positive transfer of force of the forces conducted through second hollow shaft 40, e.g., onto a drive nut 62 that fits into this groove 60. In this manner the drive nut is put into a rotary movement but hindered in its spatial progress in the longitudinal direction of the axis of rotation of second hollow shaft 40. Thus, a drive spindle 64 guided in the drive nut 62 is forced into a movement running in the longitudinal direction of the axis of rotation of second hollow shaft 40. Thus, in the end the rotary movement of second hollow shaft 40 is converted into a longitudinal movement of a lift spindle 64 of a unit.

It is of course also conceivable that such a drive only has to make a slight rotary movement such as is required, e.g., for opening and closing ball valves, namely, a quarter circular turn. The rotary motion of first hollow shaft 16 is ensured solely via first servomotor 12. Thus, e.g., an appropriate regulation of the speed of first servomotor 12 can be used in the end to change or regulate the opening speed or the closing speed of the activated unit. In this manner even any desired closing- or opening profiles with changing speeds can be performed. However, it is also a customary case that first servomotor 12 is operated at a constant speed.

The translation of the drive power of first hollow shaft 16 as regards power and torques is ensured by a suitable selection of the translation ratios in the planetary gear, namely, the suitable selection of the number of teeth of the planet wheels as well as of gear rings 34, 36. In a simple case the number of teeth of internal toothing of the first gear ring 34 as well as of the second gear ring 36 can differ by only a few teeth, e.g., three teeth in a planetary gear with three planet wheels, especially with a total tooth number of gear rings of 72 and 75 teeth. However, even larger differences of tooth numbers are possible.

Note that second hollow shaft 40 only rotates when the tooth number between gear ring 34 and 36 is different.

The translation ratio of the transmission results from the ratio of the tooth number of the planet wheels and of first gear ring 34 and of second gear ring 36. First gear ring 34 and second gear ring 36 must have a different number of teeth, as was already explained above.

Figure 2:
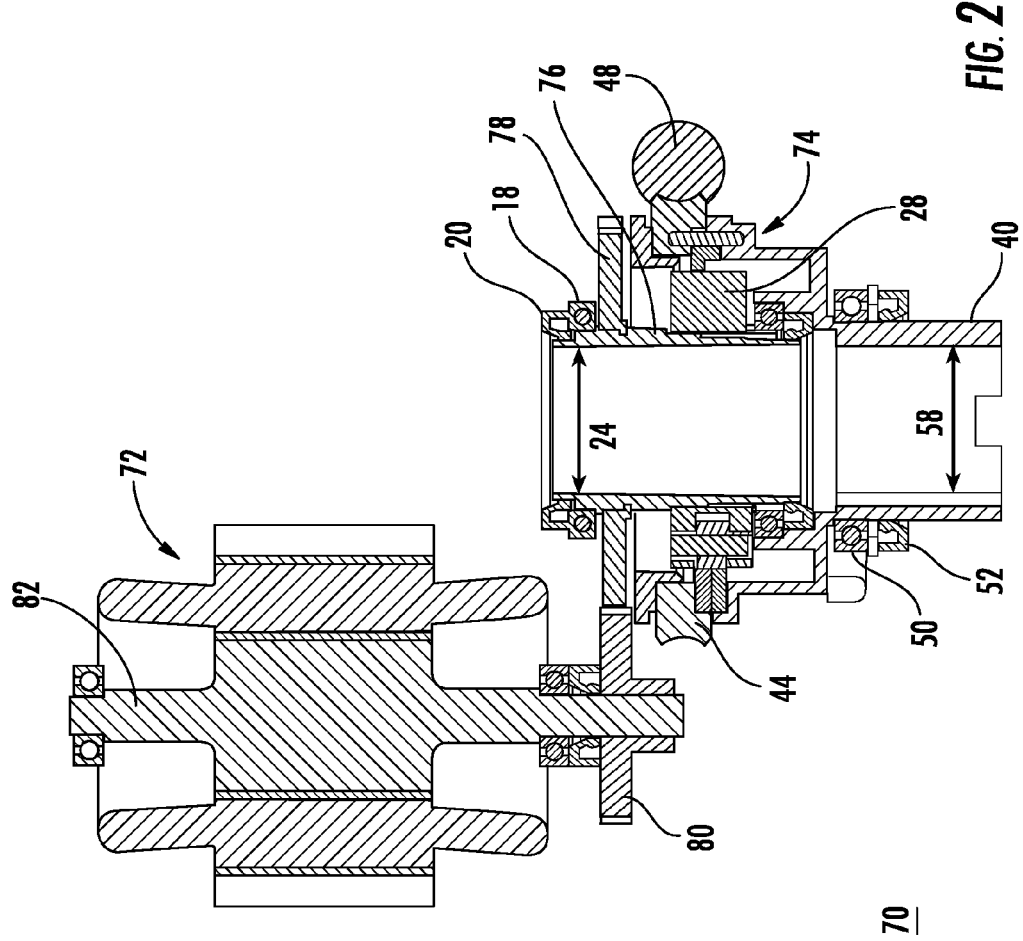

The described embodiment of the actuator in accordance with the invention has the advantage that an especially small construction volume is achieved, in particular when viewed in the radial direction to the axis of rotation of first hollow shaft 16 and second hollow shaft 40. In addition, the planetary gear used in accordance with the invention ensures an especially high efficiency and is distinguished by the planet wheels rotating about first hollow shaft 16 with an especially good quietness. An optimum of quietness is achieved if three planet wheels are used FIG. 2 shows a second actuator 70 comprising a second servomotor 72 and a second planetary gear 74. Many essential parts of second planetary gear 74 are designed like the corresponding parts of first planetary gear 14 so that the reference numerals from FIG. 1 are used for these parts. Therefore, in the following even the differences between the first actuator 10 and the second actuator 70 will be discussed in particular.

In distinction to the first actuator 10 in the second actuator 70 a third hollow shaft instead of first hollow shaft 16 is the shaft that carries planet carrier 28 and is connected to the latter. Third hollow shaft 76 has a comparable inside area 24 that for its part has a diameter corresponding to the minimal inside diameter 58. The third hollow shaft 76 has a externally toothed third gear ring 78 on its end facing away from second hollow shaft 40. This ring engages into the teeth of a fourth gear ring 80 connected to a shaft end of a drive rotor 82 of the second servomotor 72. The dimensions of the third gear ring 78 as well as of the fourth gear ring 80 are selected in such a manner that on the one hand the translation ratios corresponding to the tooth number of gear rings 78, 80 are suitable for the technical problem of the second actuator 70 to be solved and in addition the second servomotor 72 is located outside of an imaginary area resulting by a prolongation of the longitudinal extent of the inside area of the third hollow shaft 76. This ensures in any case that a drive spindle run through second hollow shaft 40 and third hollow shaft 76 can not collide with any other part of second actuator 70.

This measure brings it about that second servomotor 72 can be an especially economical standard motor. In addition, an increased flexibility in the designing of the translation ratios between second servomotor 72 and second hollow shaft 40 results from the different possibilities for the selection of the third gear ring 78 and of the fourth gear ring 80.

LIST OF REFERENCE NUMERALS

10 first actuator
12 first servomotor
14 first planetary gear
16 first hollow shaft
18 first shaft support
20 first shaft seal
22 recess
24 inside area
26 stator
28 planet carrier
30 first planet wheel
32 support bolt
34 first gear ring
36 second gear ring
38 first connection pin
40 second hollow shaft
42 second connection pin
44 support gear
46 external toothing
48 measuring shaft
50 second shaft bearing
52 second shaft seal
54 third shaft support
56 third shaft seal
58 minimal inside diameter
60 groove
62 drive nut
64 drive rod or spindle
70 second actuator
72 second servomotor
74 second planetary gear
76 third hollow shaft
78 third gear ring
80 fourth gear ring
82 drive rotor

The invention claimed is:

1. An actuator comprising:
   a motor having a drive shaft comprising a first hollow shaft, and an output shaft defining a second hollow shaft, the first and second hollow shafts having a common axis of rotation;
   a planet carrier having a hollow radially internal area and being supported by or integral with the first hollow shaft such that rotation of the first hollow shaft causes rotation of the planet carrier; and
   a planetary gear supported by the planet carrier and causing rotation of the second hollow shaft to cooperate with a drive rod of a unit to be operated,
   wherein the motor and the first and second hollow shafts are longitudinally aligned and have internal diameters such that the drive rod of the unit to be operated can extend through the first and second hollow shafts and the planet carrier.

2. The actuator according to claim 1, wherein the motor is selected from the group consisting of a servomotor, a pneumatic motor and a hydraulic motor.

3. The actuator according to claim 1, wherein the motor includes another hollow shaft that is connected to the first hollow shaft or is designed as the first hollow shaft.

4. The actuator according to claim 3, wherein an inside diameter of the said another hollow shaft is adapted to the diameter of the first and of the second hollow shaft.

5. The actuator according to claim 3, wherein the drive rod of the unit that can be connected to the output shaft can be moved in its longitudinal direction through the said another hollow shaft.

6. The actuator according to claim 3, wherein the planet carrier has at least one planet wheel, and wherein the planetary gear includes
   a first internal toothing that is in engagement with a toothing of the at least one planet wheel, and
   a support gear having a second internal toothing that is also in engagement with the toothing of the at least one planet wheel, and with which support gear occurring forces or torques can be transferred to a housing with an active connection to the support gear, and drive forces can be transferred to the at least one planet wheel or the planet carrier with the first hollow shaft,
   wherein an imaginary axis of rotation of the at least one planet wheel is always located outside of the inside diameter of the first hollow shaft.

7. The actuator according to claim 6, wherein the first hollow shaft includes a drive gear that drives the at least one planet wheel.

8. The actuator according to claim 6, wherein the support gear of the planetary gear comprises an external toothing that is in engagement with a toothing of a measuring shaft.

9. The actuator according to claim 8, wherein the forces and torques transmitted onto the measuring shaft by the support gear are received by a spring arrangement connected to the measuring shaft, and wherein the deflection of the spring arrangement is a measurement for the magnitude of the transmitted force or of the transmitted moment.

10. The actuator according to claim 8, wherein the measuring shaft is a shaft of a hand wheel or of a hand wheel transmission.

11. The actuator according to claim 1, wherein the first hollow shaft, in particular a free end of the first hollow shaft, is designed as part of the motor.

12. The actuator according to claim 1, wherein the first hollow shaft, in particular a free end of the hollow shaft, is designed as an armature or rotor of an electromotor.

13. The actuator according to claim 12, wherein the first hollow shaft and the armature, or the rotor of the electromotor are designed in one piece.

14. The actuator according to claim 1, wherein the first hollow shaft, in particular a free and of the hollow shaft, is designed as a rotor, impeller or turbine of a pneumatic motor or hydraulic motor.

15. The actuator according to claim 14, wherein the first hollow shaft the rotor, impeller or the turbine of the pneumatic motor or hydraulic motor are designed in one piece.

16. The actuator according to claim 1, wherein the second hollow shaft is designed on its front side facing away from the first hollow shaft as a positive coupling.

17. The actuator according to claim 1, wherein the first and second hollow shafts have a settable minimal inside diameter.

18. The actuator according to claim 1, wherein the second hollow shaft has an internal threading.

* * * * *